United States Patent
Kinoshita

(10) Patent No.: US 6,678,365 B1
(45) Date of Patent: Jan. 13, 2004

(54) TELEPHONE INFORMATION SERVICE SYSTEM

(75) Inventor: Takafumi Kinoshita, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 09/611,029

(22) Filed: Jul. 6, 2000

(30) Foreign Application Priority Data

Jul. 6, 1999 (JP) .......................................... 11-191793

(51) Int. Cl.[7] .......................... H04M 3/42; G09G 5/00; H04B 1/38
(52) U.S. Cl. .................... 379/201.01; 345/810; 455/564
(58) Field of Search ...................... 379/201.01, 201.02, 379/201.04, 201.05, 207.02; 345/810; 455/420, 566, 564

(56) References Cited

U.S. PATENT DOCUMENTS

| 5,821,936 A | * | 10/1998 | Shaffer et al. ............... 345/810 |
| 6,016,336 A | * | 1/2000 | Hanson .................... 379/88.23 |
| 6,263,217 B1 | * | 7/2001 | Park ........................... 455/566 |
| 6,397,060 B1 | * | 5/2002 | Oikawa ....................... 455/420 |

FOREIGN PATENT DOCUMENTS

| JP | 6386657 | 4/1988 | .......... H04M/11/00 |
| JP | 3229344 | 10/1991 | ........... G06F/13/00 |
| JP | 305360 | 11/1997 | ............. G06F/3/14 |

* cited by examiner

Primary Examiner—Benny Tieu
(74) Attorney, Agent, or Firm—Jerry W. Herndon

(57) ABSTRACT

To provide a telephone information service system capable of providing good operability and rendering information services containing attractive services without placing any burdens on a user.

A telephone information service system is disclosed, which allows a user to select and use various service items from the menu of a host system by telephone. The telephone information service system comprises first and second functions in the host system. The first function is a trigger restarting function for dynamically changing a menu composition for the user by bringing a service item hit by a trigger to the head of the menu when a trigger condition is established for a service item selected by the user, and starting up the target service item by notifying the user of the establishment of the trigger condition. In accordance with the preferred mode, the second function is a menu customizing function for sequentially providing selected services to the user without any operations performed on the part of the user from next time according to a selection of service items from a usual menu.

5 Claims, 18 Drawing Sheets

FIG. 17

ACCOUNT INFORMATION
TABLE: account

| Attribute | Data Type | Null | PK | FK: Parent Table |
|---|---|---|---|---|
| account_id | Integer | 0 | PK | |
| password | String | 0 | | |
| first_name | String | 0 | | |
| last_name | String | 0 | | |
| address | String | 0 | | |
| phone_number | String | 0 | | |
| Occupation | String | 0 | | |
| date_of_birth | Date | 0 | | |

SCENARIO INBFORMATION(STANDARD MENU, CUSTOMIZED MENU)
TABLE: account

| Attribute | Data Type | Null | PK | FK: Parent Table |
|---|---|---|---|---|
| scenario_id | Integer | 0 | PK | |
| scendario_name | String | 1 | | |
| owner_id | Integer | 1 | | FK: account_account_id (IF null, COMMON TO ALL ACCOUNTS) |
| session_data_id | String | 0 | | FK: session_data.session_data_id |

SERVICE ITEM INFORMATION(STANDARD MENU, CUSTOMIZED MENU)
TABLE: session data

| Attribute | Data Type | Null | PK | FK: Parent Table |
|---|---|---|---|---|
| session_data_id | Integer | 0 | PK | FK: data_item_data.session_data |
| frame_sound_data | String | 1 | | |

ITEM DATA INFORMATION
TABLE: data item data

| Attribute | Data Type | Null | PK | FK: Parent Table |
|---|---|---|---|---|
| data_item_id | Integer | 0 | PK | |
| session_data_id | Integer | 0 | PK | FK: session_data.session_id |
| data_item_position | Ineger | 1 | | (REALTIVE POSITION IN FRAME) |
| item_data | Sound | 1 | | |
| source_data_address_table_name | String | 0 | | TABLE NAME OF ORIGINAL DATA |
| source_data_address_column_name | String | 0 | | COLUMN NAME OF ORIGINAL DATA |

(NOTE) Null 0: NULL VALUE DISABLED/1: NULL VALUE ENABLED,
PK: Primary Key, FK: Foreign Key

FIG. 18

COMMAND INFORMATION
TABLE: command_data

| Attribute | Data Type | Null | PK | FK: Parent Table |
|---|---|---|---|---|
| command_data_id | Integer | 0 | PK | |
| session_data_id | Integer | 0 | | FK: session_data.session_data_id |
| command_name | String | 0 | | (CLASS NAME OF COMMAND) |
| command_data | String | 1 | | (INSTANCE DATA OF COMMAND OBJECT) |

TRIGGER INFORMATION
TABLE: trigger

| Attribute | Data Type | Null | PK | FK: Parent Table |
|---|---|---|---|---|
| trigger_id | Integer | 0 | PK | |
| account_id | Integer | 0 | | FK: session_data.session_data_id |
| action_command_name | String | 0 | | (CLASS NAME OF COMMAND AT TIME OF ACTION EXECUTION) |
| action_command_data | String | 1 | | (INSTANCE DATA AT TIME OF ACTION EXECUTION) |
| condition_check_option | String | 1 | | (OPTION AT TIME OF CONDITION CHECKING) EXAMPLE "AND", "OR" |
| fired_flag | Boolean | 0 | | (FLAG INDICATING FIRED STATE) |

TRIGGER CONDITION INFORMATION
TABLE: trigger_condition_on

| Attribute | Data Type | Null | PK | FK: Parent Table |
|---|---|---|---|---|
| trigger_condition_id | Integer | 0 | PK | |
| trigger_id | Integer | 0 | | FK: trigger.trigger_id |
| data_item_id | Integer | 0 | | FK: data_item_data.data_item_id |
| bound_data | Double | 0 | | (SET THRESHOLD VALUE SAMPLE: (ITS USD): 123.00 |
| check_command_name | String | 0 | | (THRESHOLD VALUE CHECKING COMMAND) EXAMPLE: "Greater Than" |

(NOTE) Null 0: NULL VALUE DISABLED/1: NULL VALUE ENABLED,
PK: Primary Key, FK: Foreign Key

TELEPHONE INFORMATION SERVICE SYSTEM

FIELD OF THE INVENTION

The present invention relates to a telephone information service system, which allows a user to select and use various service items from a menu of a host system by telephone.

BACKGROUND OF THE INVENTION

Conventionally, systems of various configurations have been available that allow a user to select and use various service items from the menu of a host system,. As an example, the menu of telephone information services operated by a menu having a hierarchical tree structure is known. In this example, however, some problems are inherent, i.e., the necessity of performing an operation by recognizing the location of a desired service item in the tree structure, the complexity of an operation for accessing a plurality of service items, and the long operation time. As another example, a menu of telephone information services, where an address of a service item is directly specified, is known. Also, in this example, some problems are inherent, i.e., the necessity of performing an operation by recognizing an address of a desired service item, and the necessity of using tools on the user's part.

To solve the difficulty and complexity of operations inherent in the foregoing prior art, a technology was disclosed in Japanese Patent Laid-Open No.3 (1991)-229344. This technology is designed to simplify an entering operation by a user and to shorten connecting time by connecting a storage medium programmed to display a particular menu for personal use to a user terminal. Another technology was disclosed in Japanese Patent Publication No.7 (1995)-97789. This technology includes an automatic data transmitting mode and an automatic data receiving mode as functions of a data terminal phone: the automatic data transmitting mode being for storing data on a requested information service beforehand according to the menu, and then starting processing at a time set in a timer, and the automatic data receiving mode for automatically receiving and storing various data generated at random time.

However, in any of the foregoing technologies having improved operability, since the functions were provided on the terminal side for the purpose of solving the problems, each user needed a specialized terminal and, consequently, costs were increased. In addition, services to be provided were not satisfactory.

SUMMARY OF THE INVENTION

The present invention solves the foregoing problems, and it is an object of the invention to provide a telephone information service system capable of providing improved operability and rendering information services including attractive services without placing any burdens on the user.

The telephone information service system of the present invention enables a trigger condition to be set for each service item. When the system detects establishment of a trigger condition, preferably, a trigger-established service item is added to the head of the menu of the user, and a menu composition is dynamically changed (registered before the composition registered by the user). Assuming that a callback has been set for a trigger action, the system automatically makes a call and, immediately after connection, the user can get a service from the target service item. Thus, the user can receive services at a desired timing beyond a concept of time. Also, in accordance with a preferred mode, among service items in the menu typically having a tree structure, those frequently used by the user can be selected and registered. Thereafter, since the service items selected by the user are automatically provided in order at time of use, the services can be available without any operations using the menu.

The telephone information service system of the present invention constructed in the foregoing manner is effective in the following respects. A menu operation can be simplified and facilitated for the user. A reduction in standby time by shortened service using time per head can improve services. There is little influence even if the menu composition is changed (compared with a method of equipping the terminal side with the function). By simplifying the selecting method or the method for providing the selected items, the easy operation can be customized.

The use of a trigger function can eliminate the necessity of a user's making frequent calls to check information.

Notification at a timing desired by the user can considerably improve services and increase sales more for the service providing side.

Since the method of calling back by telephone in the trigger function puts no limits on target users, services can be provided to many users at low initial costs.

In accordance with a preferred embodiment of the invention, a menu customizing function and a trigger restarting function include a menu service section for controlling a menu, a trigger setting section for setting a trigger, an information updating service section for updating service information, an inbound management section for passing a call from a user to the menu service section, and an outbound management section for dialing a specified telephone number and passing processing to the menu service section after line connection.

Further, the menu service section includes a function for performing addition, correction, deletion and other actions by collectively treating a guidance section (menu section) and an information section of a telephone menu as information, receivable commands and a group of executable commands (session data), rather than separately treating above two sections. A function (customizing function) is provided for dynamically changing the menu composition for the user and system configuration and for storing a menu composition for each user by using a user identifier as a key. A function is provided for enabling the system to provide a service as a telephone menu based on the menu composition customized and stored for each user.

The trigger setting section includes a function for enabling the user to set a trigger condition, an action for a value of a service item, and a function for storing the set trigger condition and the set action.

The information updating service section includes a function for updating service information in accordance with updating of a data source of a provided service, a function for detecting trigger establishment by checking a set trigger condition when information is updated, a function for dynamically changing the menu composition by adding a menu item hit by a trigger to the head of a customized menu for the user, and a function for passing a user telephone number to the outbound call management section to make a call.

Furthermore, in accordance with a preferred system configuration of the present invention, the telephone information service system includes a telephone line physical layer interface for interchanging information with the user by telephone; a session manager for controlling a session composed of a session data scenario made of a group of commands corresponding to respective service items; a command processor for executing the commands; and a trigger manager for performing trigger registration, condition checking and other actions.

As apparent from the foregoing, the present invention is advantageous in the following respects. A menu operation can be simplified and facilitated for the user. Shortened service times improve services. By simplifying the selecting method and the method of providing selected items, operations can be customized and thereby made easier. The use of the trigger function eliminates the necessity of a user's making frequent calls to check information. The provision of information to a user is scheduled according to a timing desired by the user. Accordingly, services can be considerably improved and sales can be increased on the service providing part. Since the method of trigger call-back to a user puts no limits on target users, services can be provided to many users at low initial costs.

BRIEF DESCRIPTION OF THE DRAWINGS

FIG. 17 is a view showing an example of a table used in the system shown in FIGS. 3 to 5; and FIG. 18 is a view showing another example of a table used in the system shown in FIGS. 3 to 5.

PREFERRED EMBODIMENT OF THE INVENTION

Figure 1:
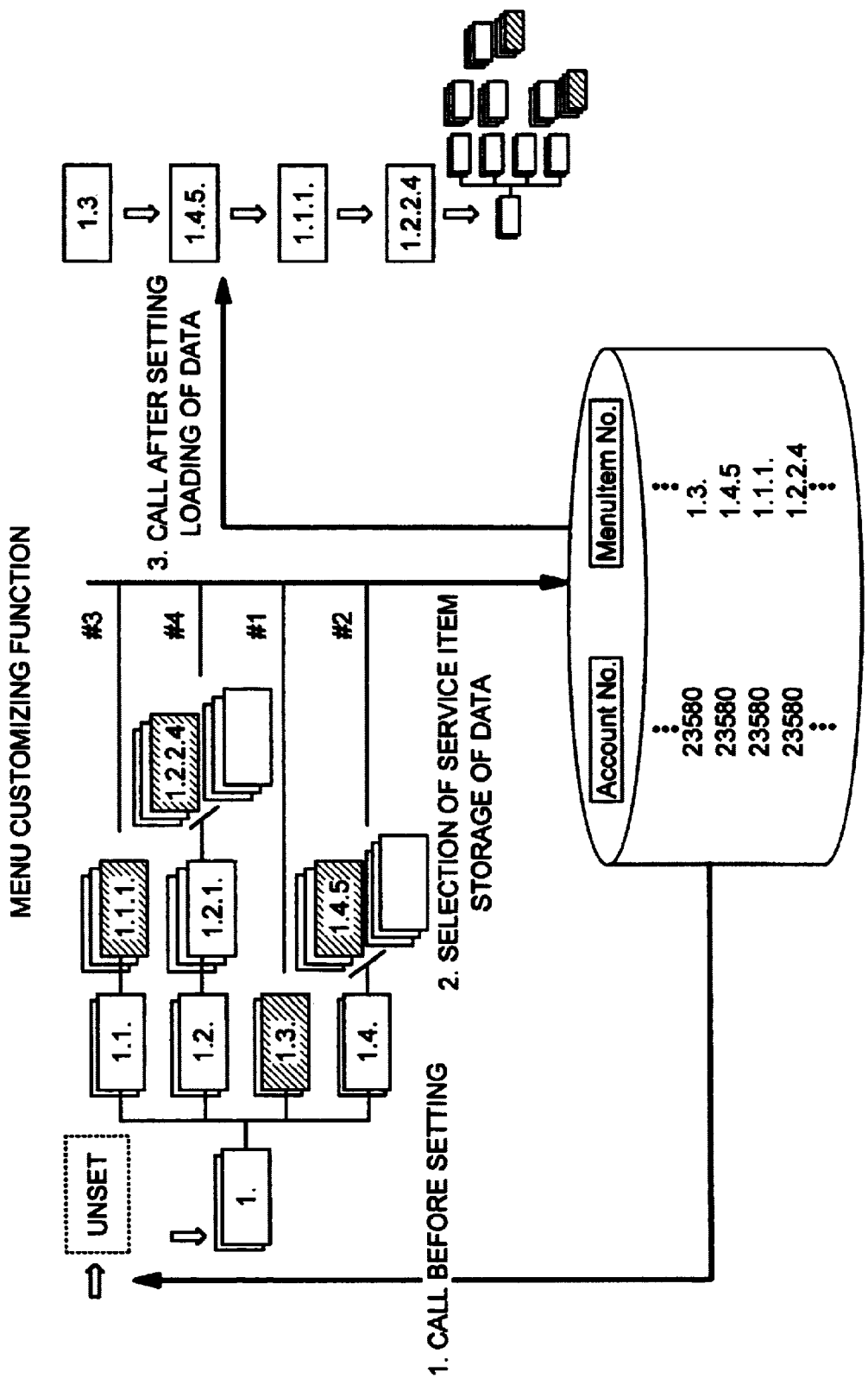
FIG. 1 is a view illustrating a menu customizing function provided in a telephone information service system of the present invention.

FIG. 1 illustrates a menu customizing function provided in a telephone information service system of the present invention. The menu customizing function of the invention serves in such a manner that a user selects service items from a usual menu and then, for next time, the user can get selected service items in the same sequence without performing any operations. An example of FIG. 1 shows a case where the usual menu is composed of four classes of service items under the category 1. Service item 1.3., service item 1.4.5., service item 1.1.1. and service item 1.2.2.4. are selected in that written order from the menu.

Numbers of the selected service items are registered in the column of Menu Item No. in storage 102, together with the Account No. 23580 of the user in the selected order. Then, upon receiving a call from the user after the service items have been set, the numbers of the service items corresponding to the Account No. of the user, i.e., Account No. 23580 in this case, are read in sequence from Menu Item No., and loaded as customized data intrinsic to the user. Then, services are rendered in the loaded order, i.e., in the order of service item 1.3., service item 1.4.5., service item 1.1.1., and service item 1.2.2.4.

The invention equips the host system of a call center (one example of a telephone information service system) with the above menu customizing function, and accordingly enables the user to easily and conveniently use services by a general telephone set. In actual use, permission of limited and simple customization by easy registration enables easy use of the services. Also, since any changes of the provided service menu can be dealt with only by changes made in the host system, a service receiving side will never be affected.

Figure 2:
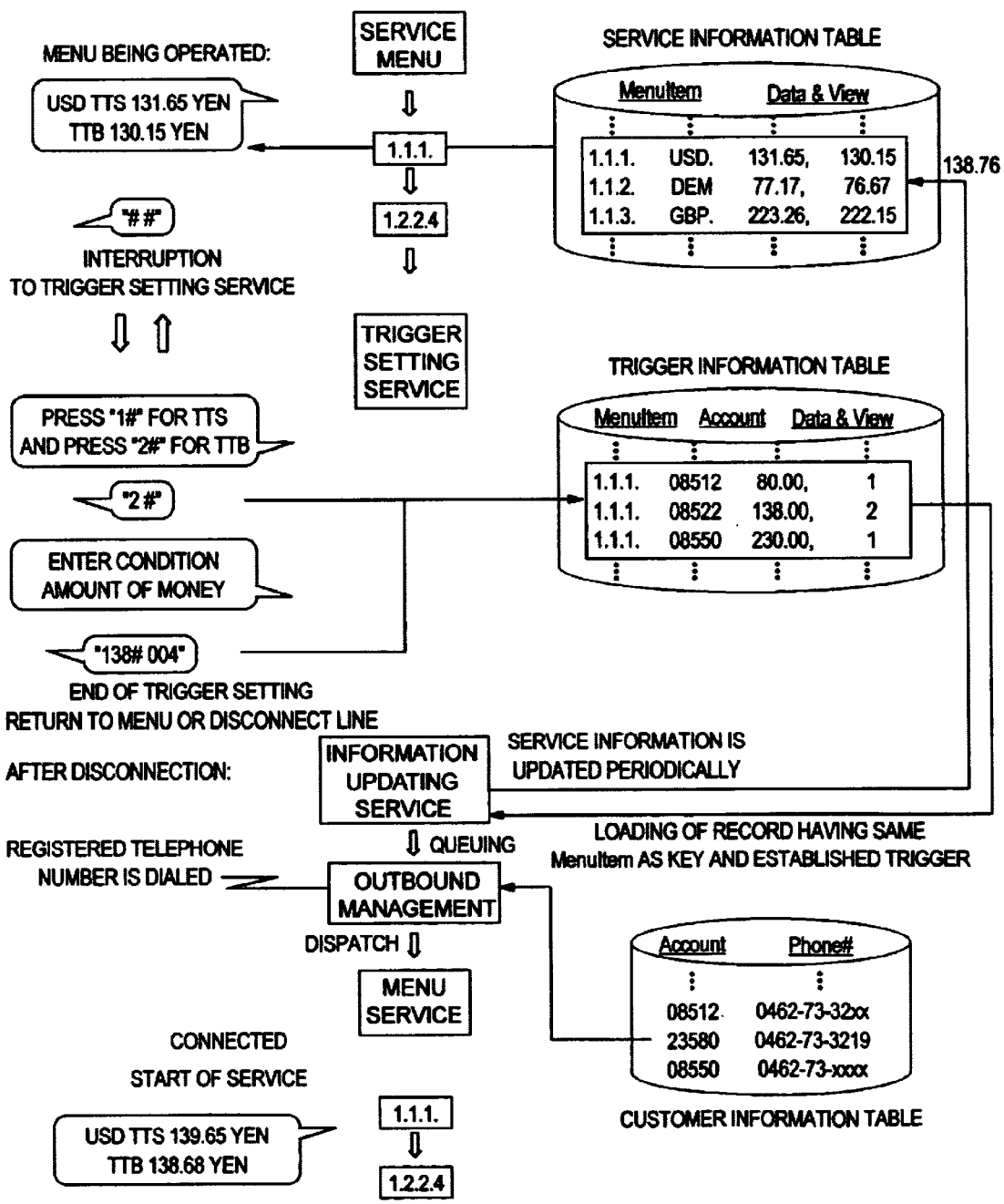
FIG. 2 is a view illustrating a trigger restarting function provided in the telephone information service system of the invention.

FIG. 2 illustrates a trigger restarting function provided in the telephone information service system of the present invention. The trigger restarting function of the invention serves in such a manner that a trigger condition typically, but not necessarily, selected by the user is set for a service item and, when the system detects establishment of the trigger condition, a menu composition for the user is dynamically changed by bringing the service item hit by the trigger to the head of the menu; then a function such as a callback can be made to a set telephone number. The trigger restarting function will now be described based on two functional divisions: a trigger setting service during a menu operation and a trigger function after disconnection of a telephone line.

First, the trigger setting service during the menu operation is effected by interruption made in the middle of the menu operation after the telephone line has been connected. FIG. 2 shows an example of setting a relevant trigger condition when in a dollar exchange rate service of a service item 1.1.1, TTS (Telegraphic Transfer Selling) of a dollar is 131.65 yen, and TTB (Telegraphic Transfer Buying) is 130.15 yen. The trigger condition is stored together with a service item number in a service information table for each user. Also, a latest yen-dollar rate is supplied periodically from an information updating service. Specifically, for example, while a content of a current service item is reported from the call center during execution of the service item 1.1.1., interruption occurs if the user keys in "##" from a telephone set at 202, and then the process moves to the trigger setting service at 204. The user keys in "1#" for setting a trigger for TTS, and "2#" for setting a trigger for TTB in accordance with a message from the call center. It is assumed in the example that "2#" is keyed in for setting a trigger for TTB. Further, "133#00#" is keyed in at 206 if a condition is to be changed to 138.00 yen per dollar in accordance with a message from the call center. After this entry, a trigger condition is set at 208 together with a service item number and Account No. of the user in the trigger information table. Then, trigger setting is ended, and the process returns to the interrupted menu.

Subsequently, after the line has been disconnected, first, an information updating service 210 periodically updates service information, e.g., a yen-dollar rate, and in the trigger information table, the trigger function checks all the conditions by using the service item 1.1.1. as a key in the same Menu Item, e.g., a yen-dollar rate, and loads a record into a queue 212 where a trigger can be established. Specifically, if a rate is updated to, for example, 139.00 yen per dollar in the information updating service, all the triggers of the service item 1.1.1. are checked, and a record coincident with the trigger condition thereof is loaded. After the record has been loaded, the information updating service supplies the record to an outbound management section. The outbound management section searches a telephone number of a user of the record in a customer information table in accordance with the supplied record, and calls the registered telephone number at 214. If there is a response from the user, the target service item is brought to the head of the menu so as to start the service, and the establishment of the trigger condition for the service item is notified. Upon having received this information at 216, the user can recognize in real time that, for example, in the above case, the yen-dollar rate has satisfied the desired trigger condition, and then carry out desired trading in real time.

The above case was the example where the outbound management service called the telephone number of the user. Other than calling the telephone number when the trigger condition is satisfied, however, a content thereof may be sent to a registered e-mail address or a registered Fax number.

The foregoing trigger restarting function provided in the telephone information service system of the invention is a very practical method considering the current popularized use of PHS or portable telephone sets. After establishment of the trigger condition, a call is made to the registered telephone number as its action; account information and a personal ID No. are verified and then a trigger-fired service item is provided. To cite an example of services provided by a security company, not only a timing for satisfying a condition of dealings desired by the user can be notified, but also a state enabling dealings to be done by line connection can be provided. In other words, by equipping the call center with the invention, outbound services can be rendered very efficiently without any work of an operator or the like. This is possible because, since the user sets a trigger, calling-back or a content thereof is predicted beforehand. From the security company side that provides services, active rendering of outbound services can be achieved without any labor costs of operators, and an increased degree of satisfaction of the user can increase sales. In this respect, the services are greatly different from those provided by Fax or e-mail.

Figure 3:
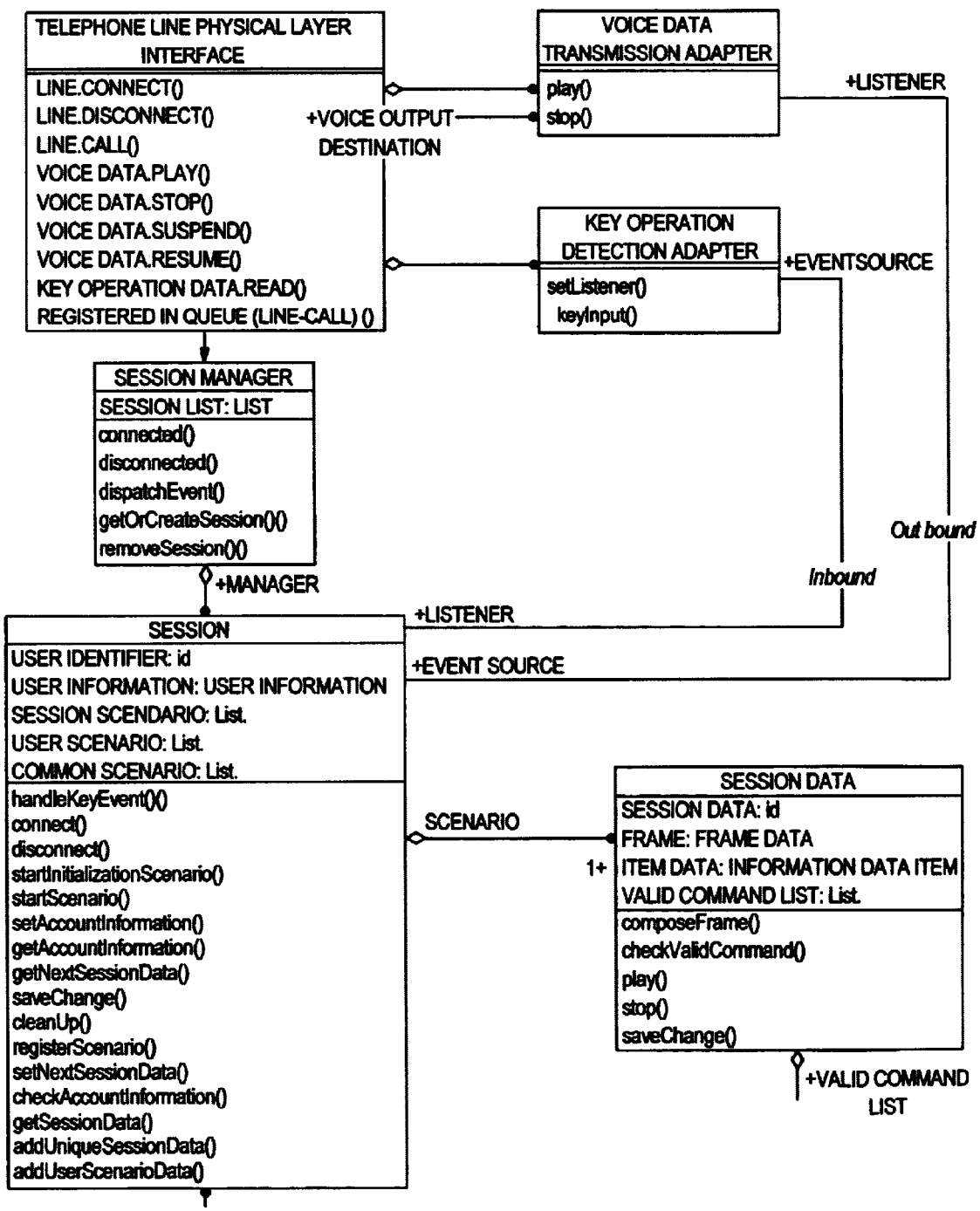
FIG. 3 is a view showing part of a configuration example of a system for realizing the menu customizing function and the trigger restarting function.
Figure 4:
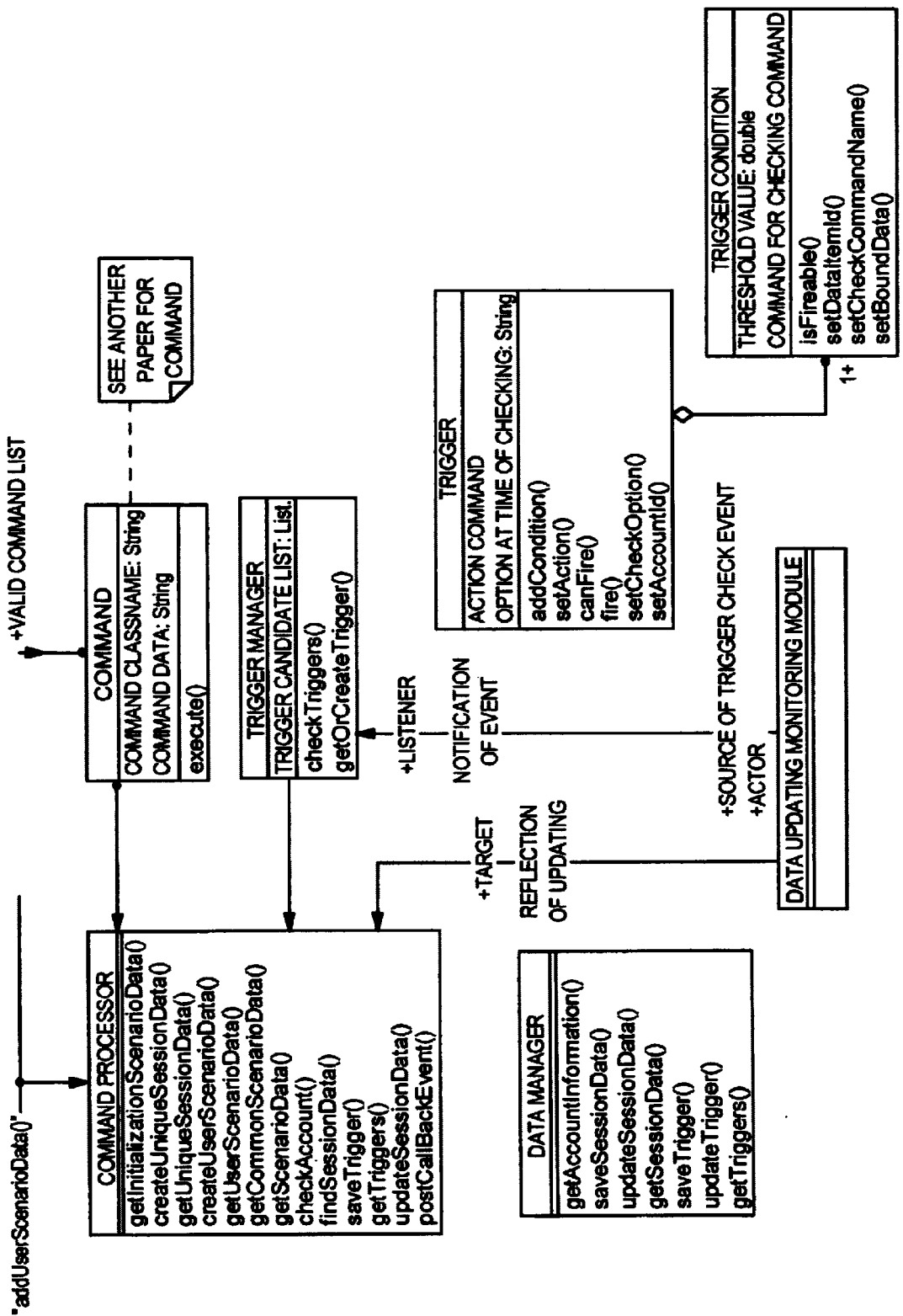
FIG. 4 is a view showing another part of the configuration example of the system for realizing the menu customizing function and the trigger restarting function.
Figure 5:
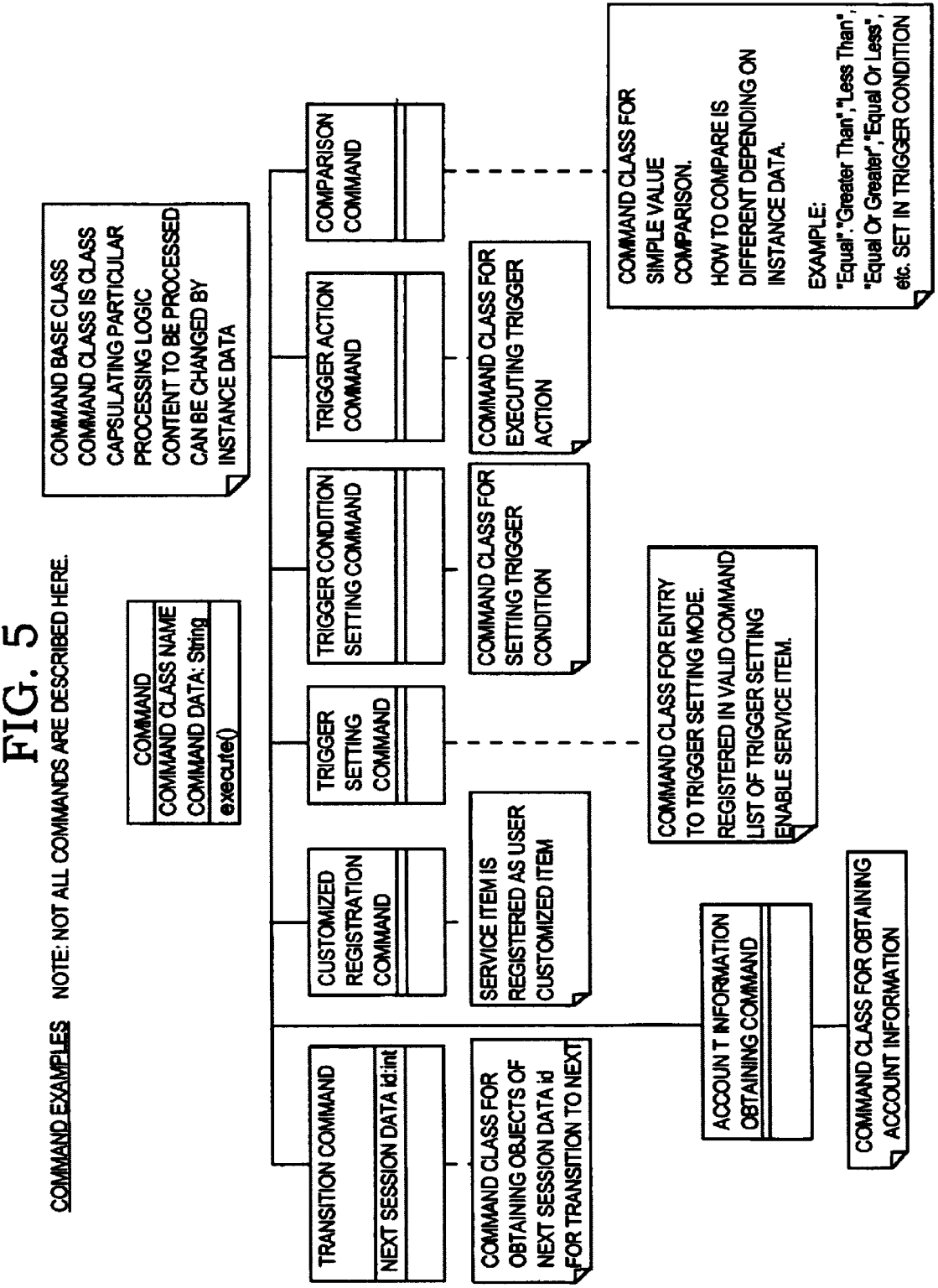
FIG. 5 is a view showing yet another part of the configuration example of the system for realizing the menu customizing function and the trigger restarting function.
Figure 6:
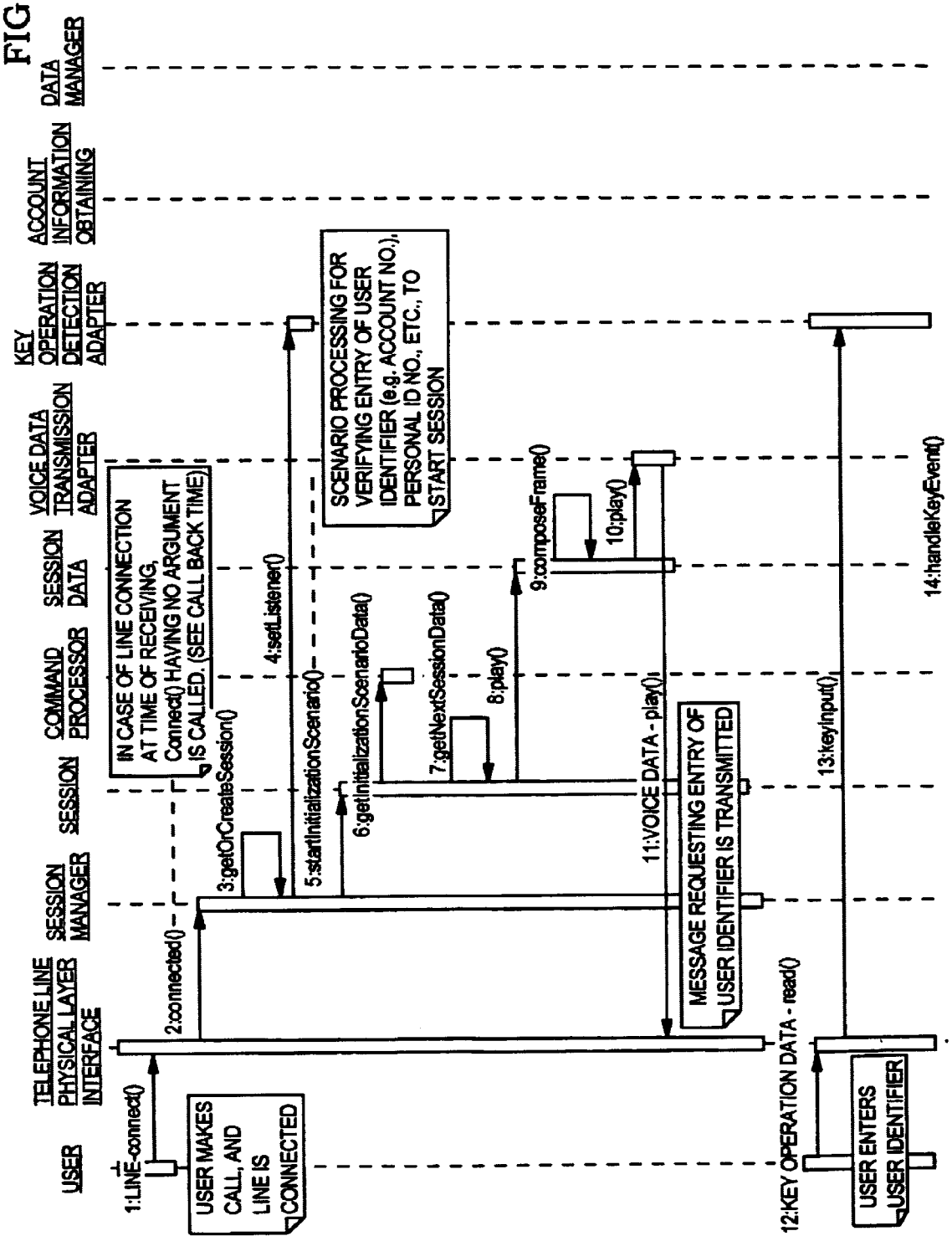
FIG. 6 is a view showing part of the tracing of messages at the time of line connection.
Figure 7:
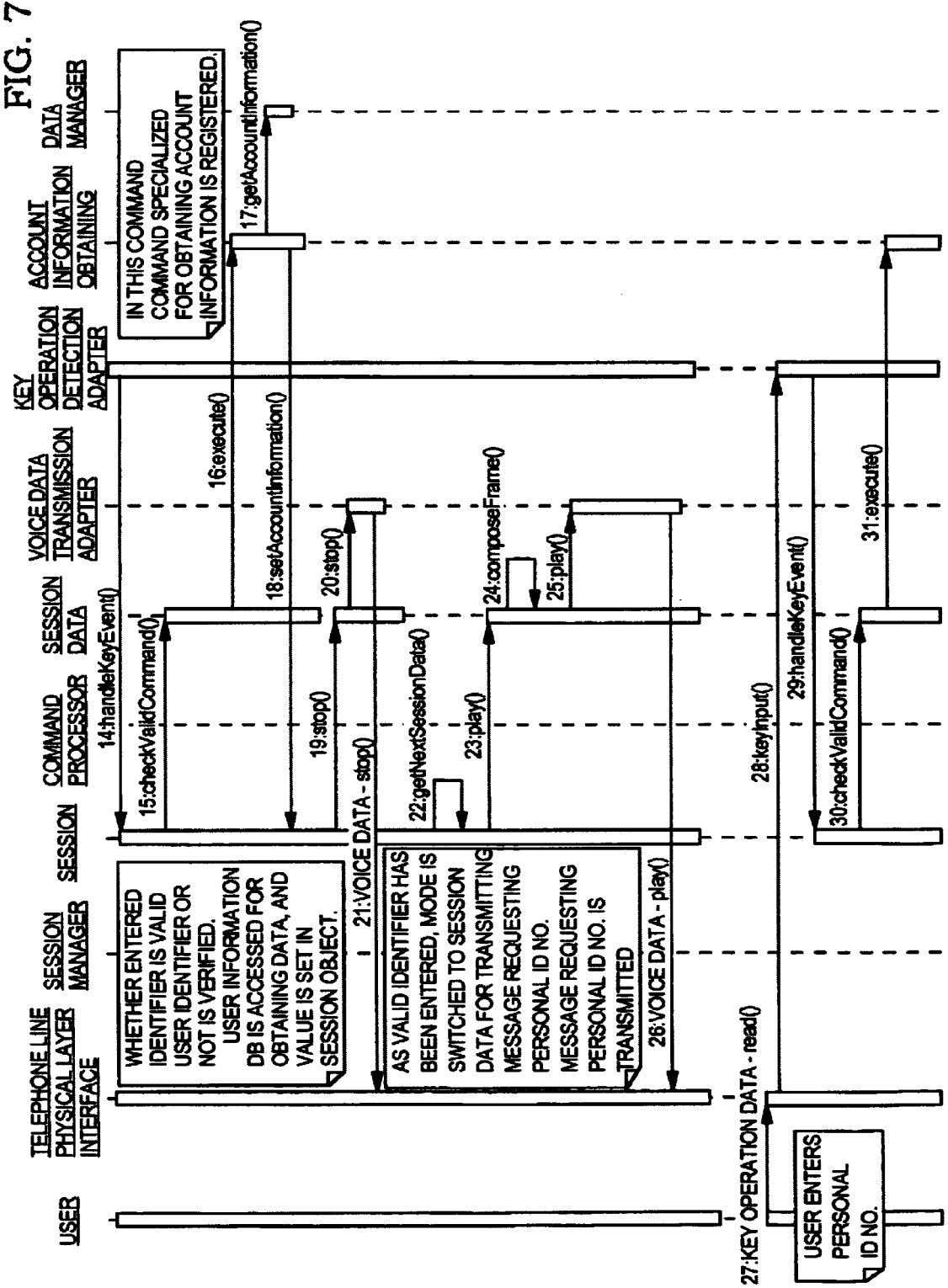
FIG. 7 is a view showing another part of the tracing of messages at the time of line connection.
Figure 8:
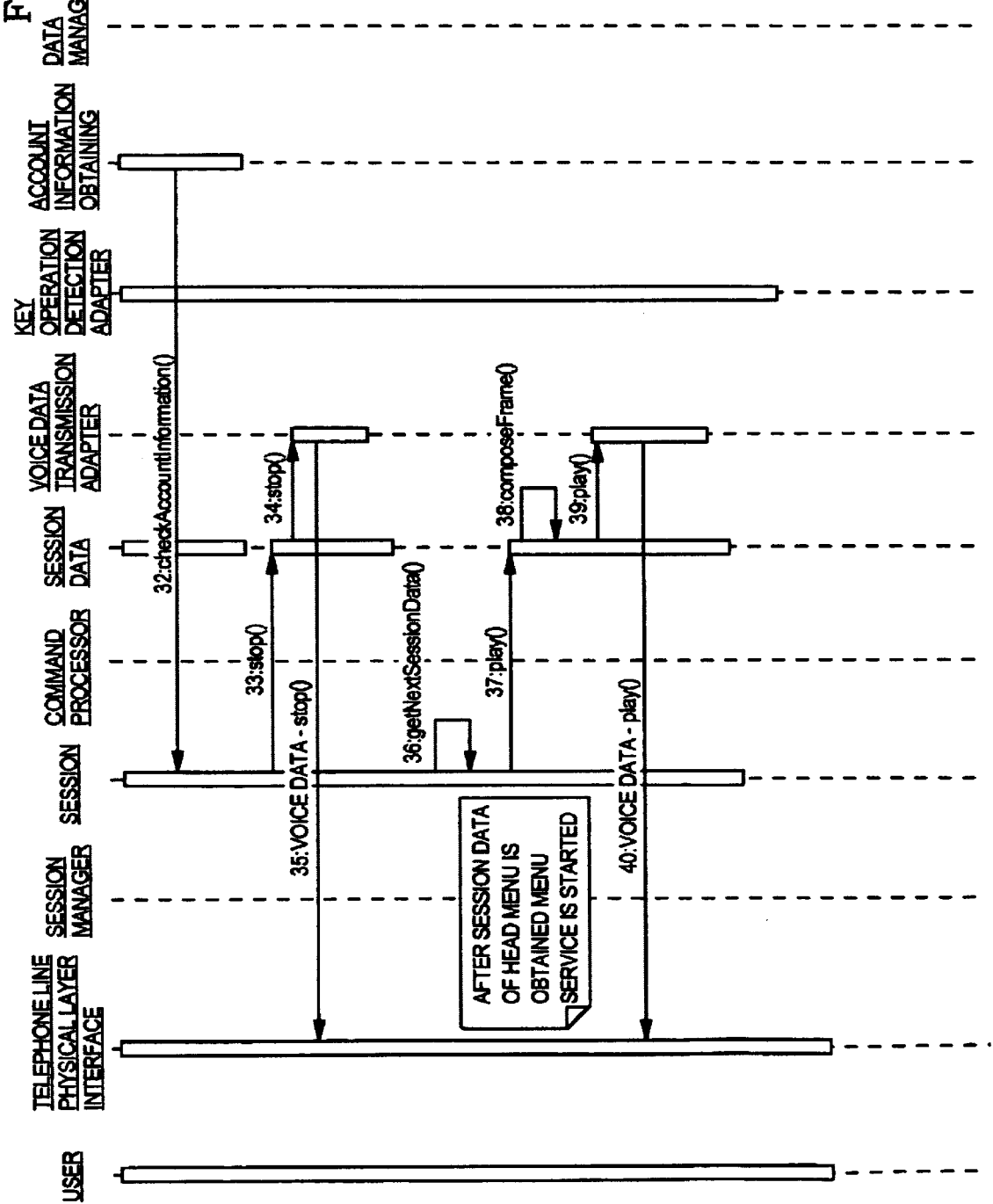
FIG. 8 is a view showing yet another part of the tracing of messages at the time of line connection.

Next, description will be made of an example of a system configuration for realizing the menu customizing function and the trigger restarting function in the telephone information service system of the present invention. FIGS. 3 to 5 are class logical views, each of which shows an example of system configuration for realizing the menu customizing function and the trigger restarting function. Among reference marks representing objects shown in FIGS. 3 to 5, "à" means a manager, "and" means existence of more than one person. Main portions of the system shown in FIGS. 3 to 5 include a telephone line physical layer interface for interchanging information with the user by telephone, a session manager for controlling a session composed of a session data scenario, which is made of a group of commands corresponding to respective service items, a command processor for actually executing the commands and a trigger manager for performing trigger registration, condition checking and so on.

Figure 9:
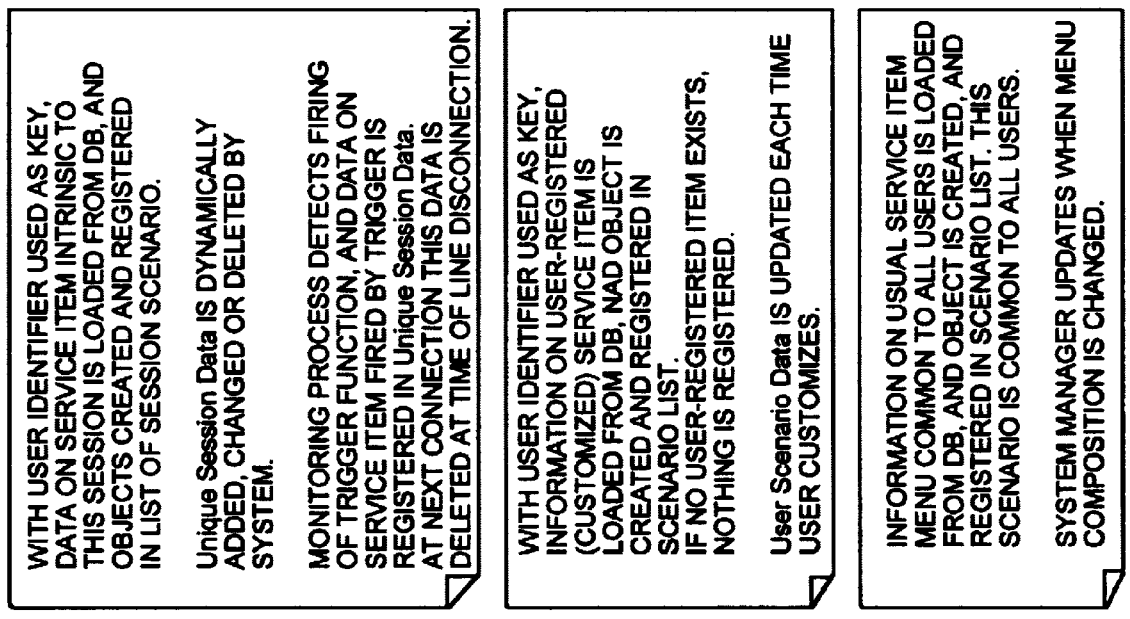
FIG. 9 is a view showing the tracing of messages at the time of a scenario obtaining a connection.
Figure 10:
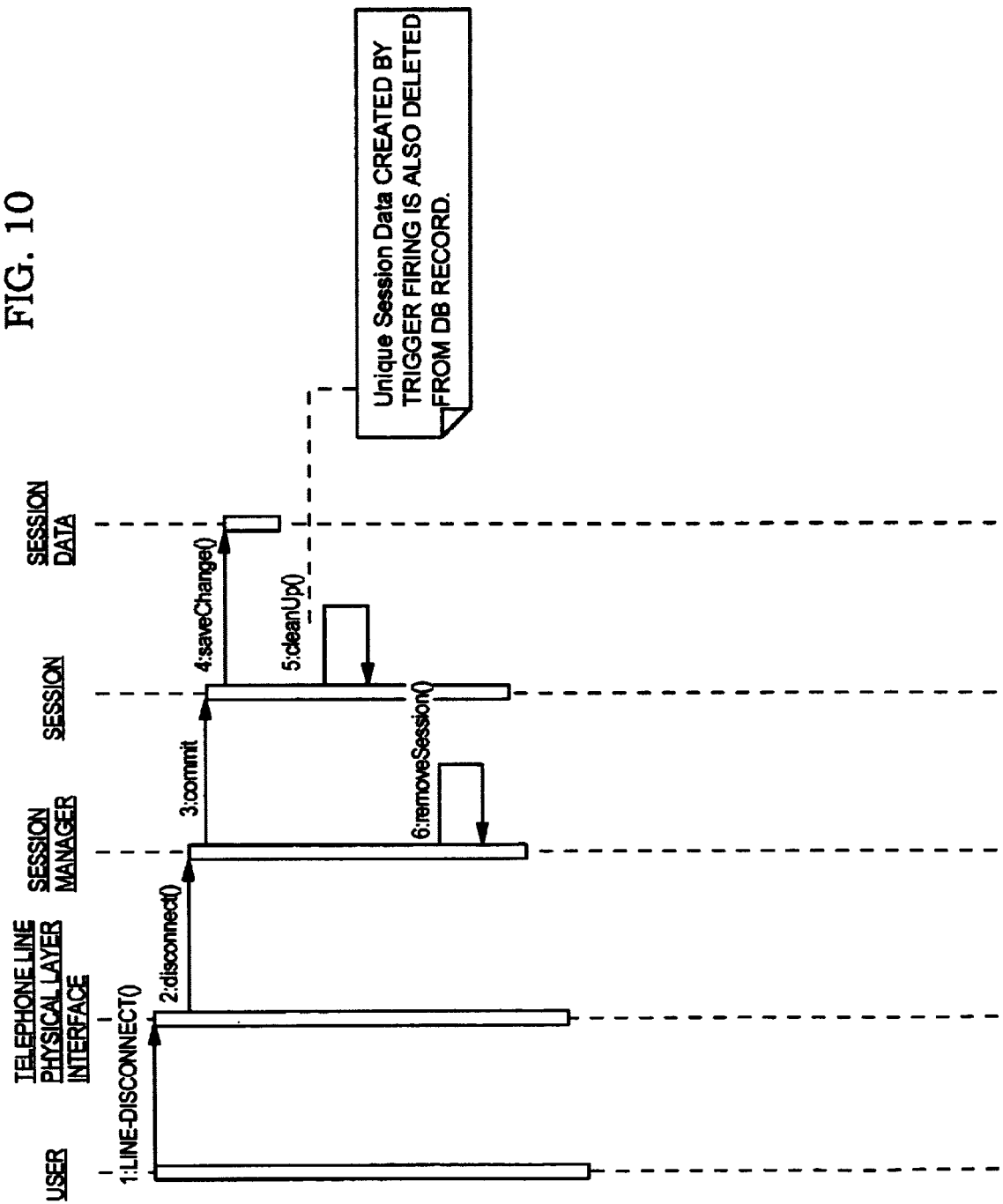
FIG. 10 is a view showing tracing of messages at time of line disconnection.
Figure 11:
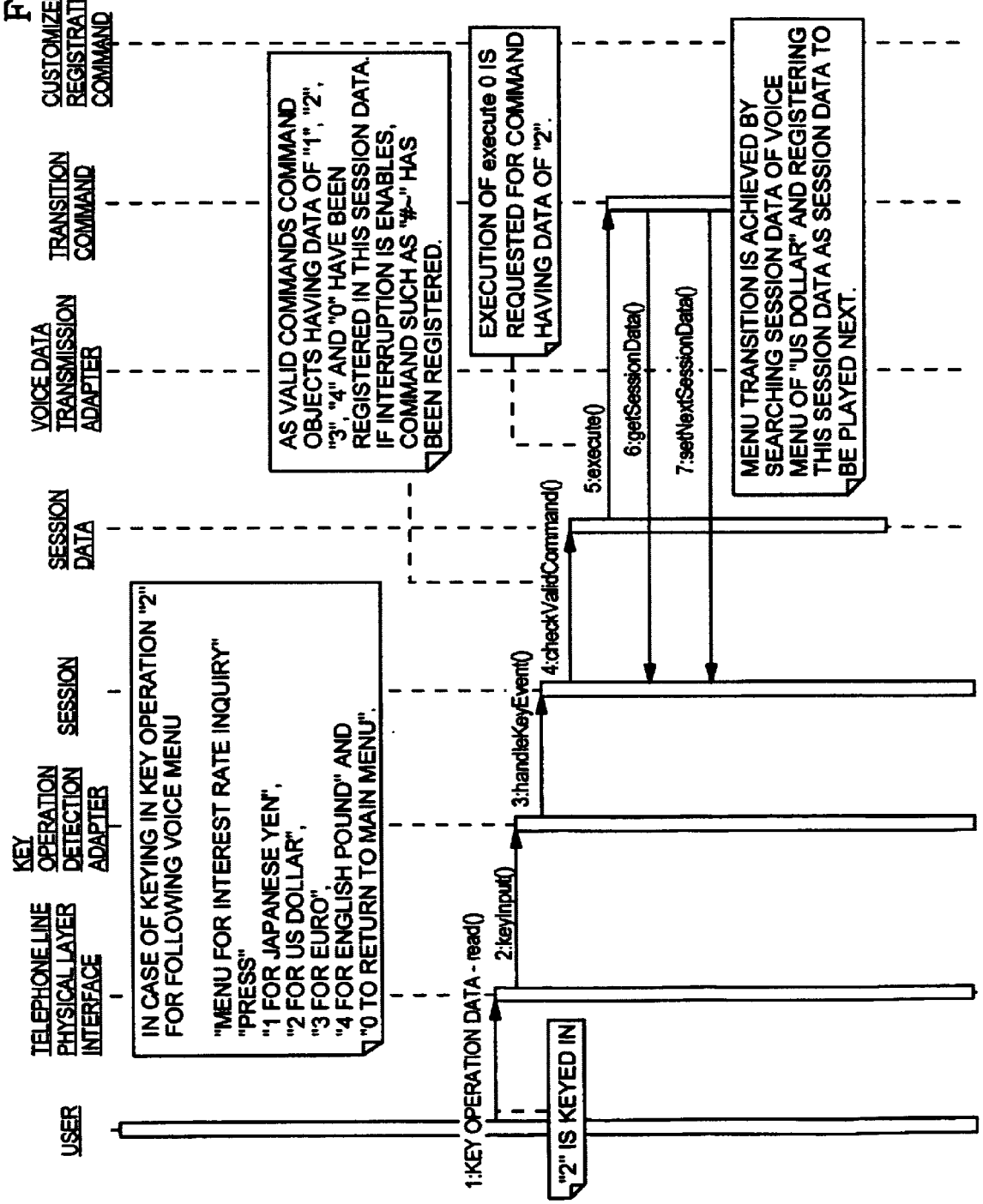
FIG. 11 is a view showing a part of tracing of messages at time of command recognition, execution thereof and customization.
Figure 12:
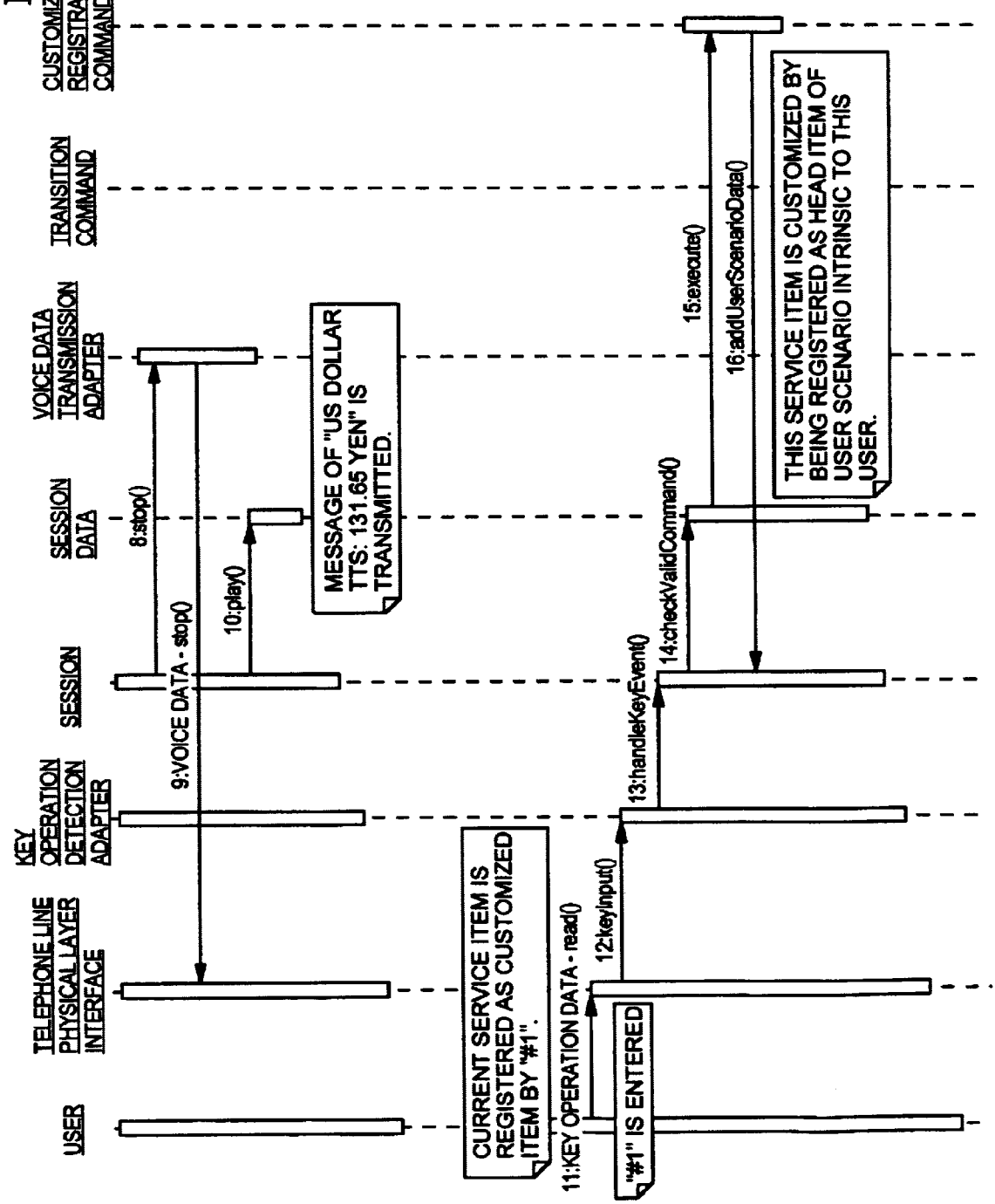
FIG. 12 is a view showing another part of tracing of messages at time of command recognition, execution thereof and customization.
Figure 13:
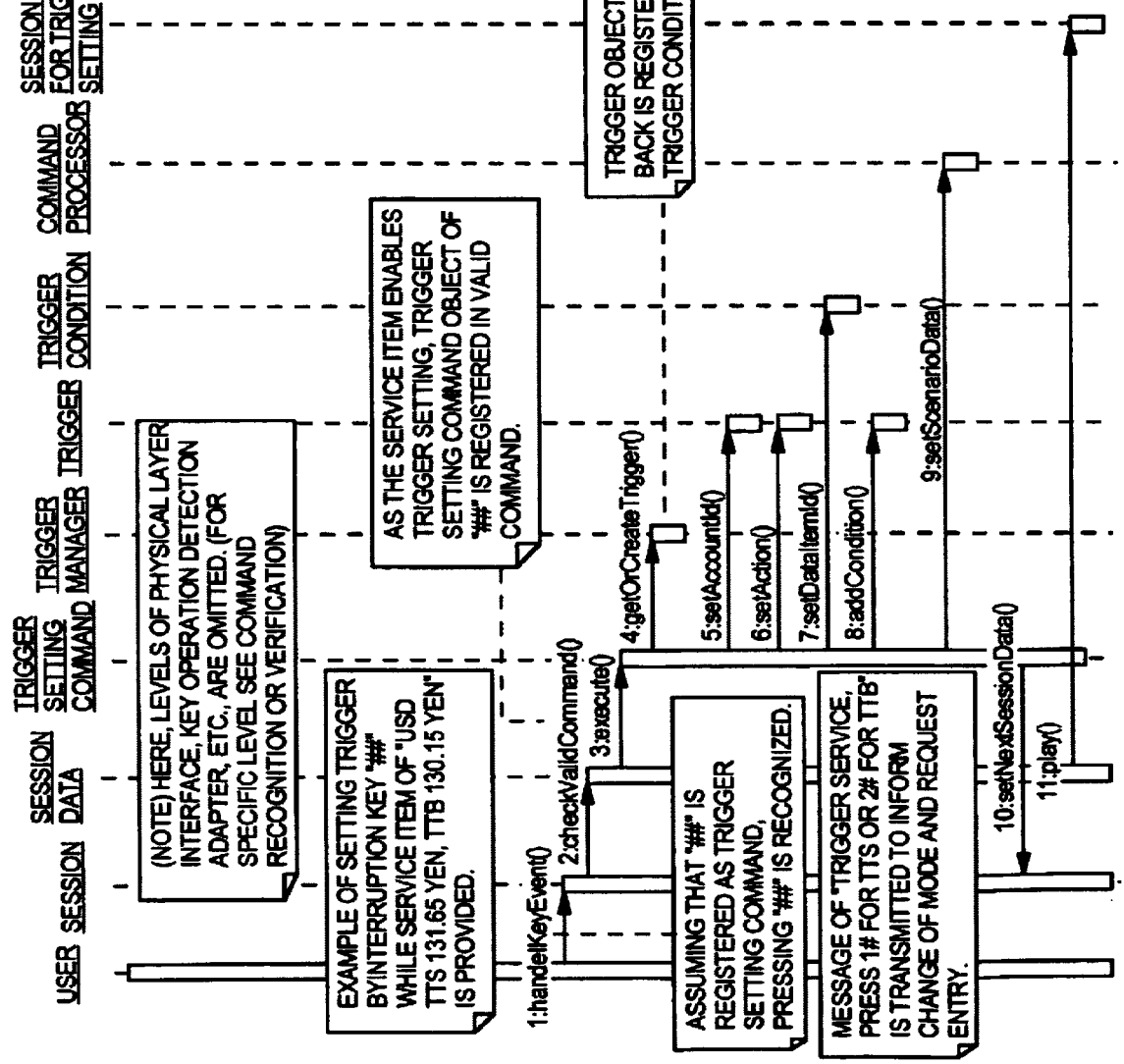
FIG. 13 is a view showing a part of tracing of messages at time of trigger setting.
Figure 14:
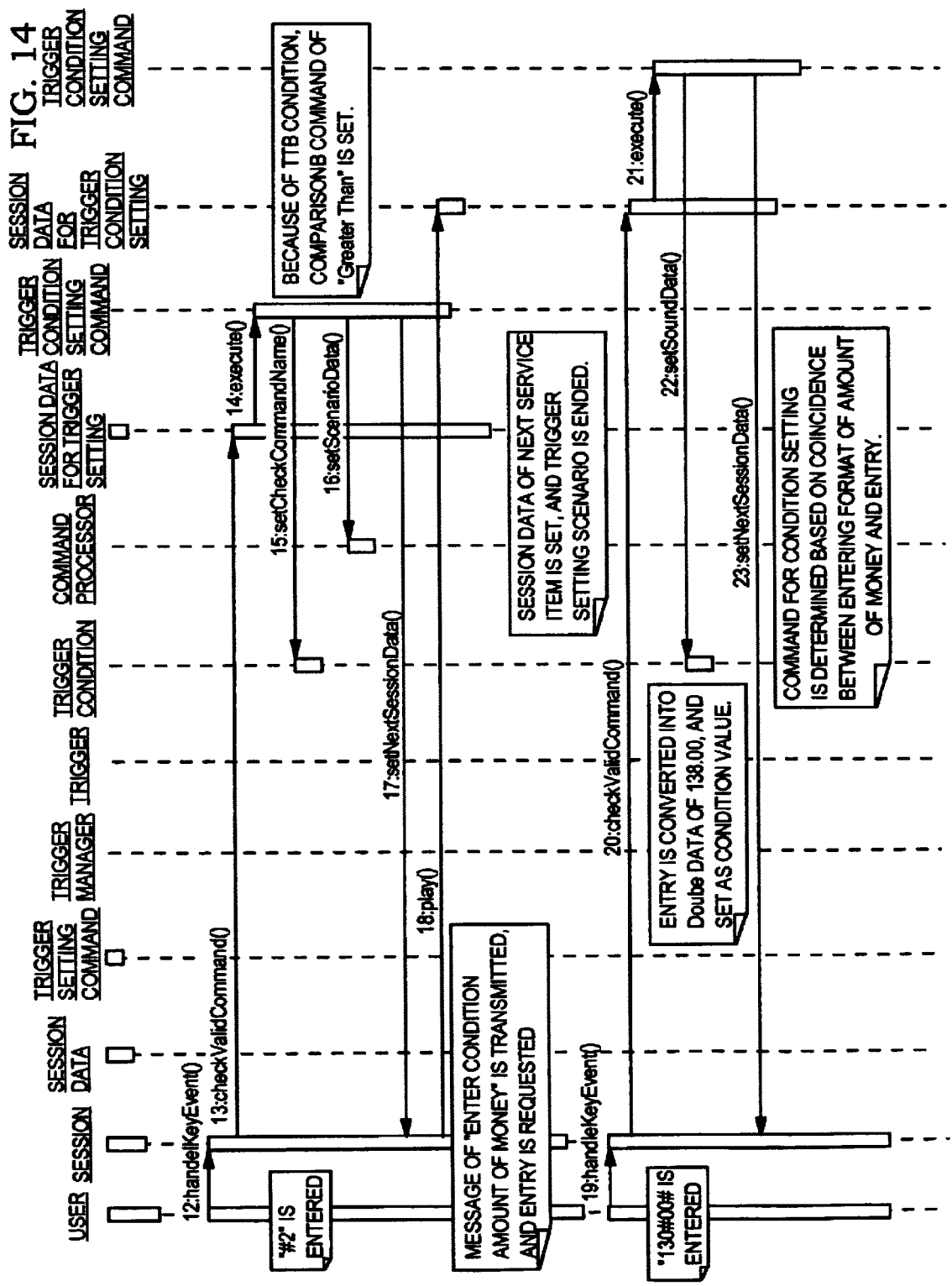
FIG. 14 is a view showing another part of tracing of messages at time of trigger setting.
Figure 15:
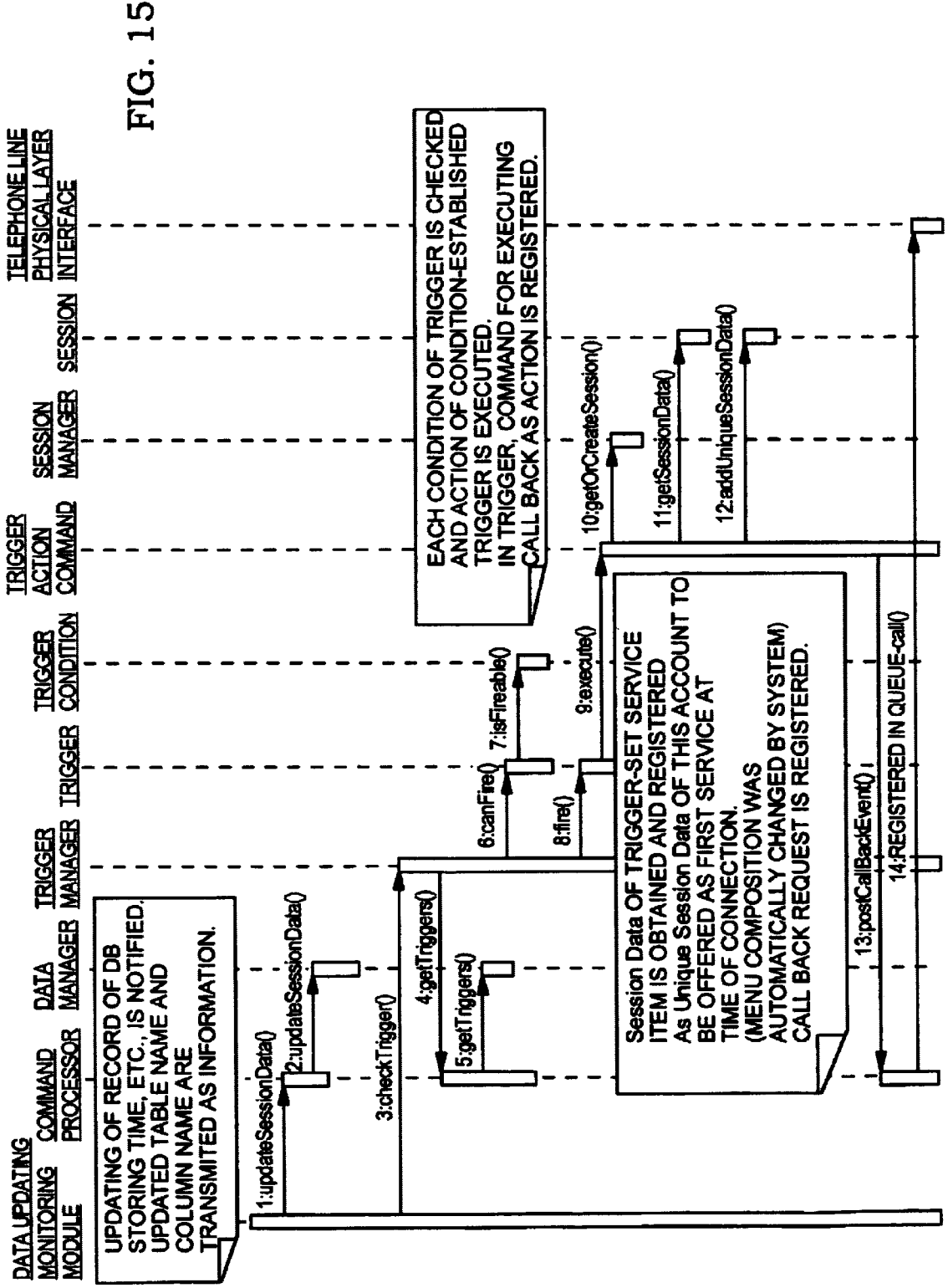
FIG. 15 is a view showing a part of tracing of messages at time of trigger determination and action execution.
Figure 16:
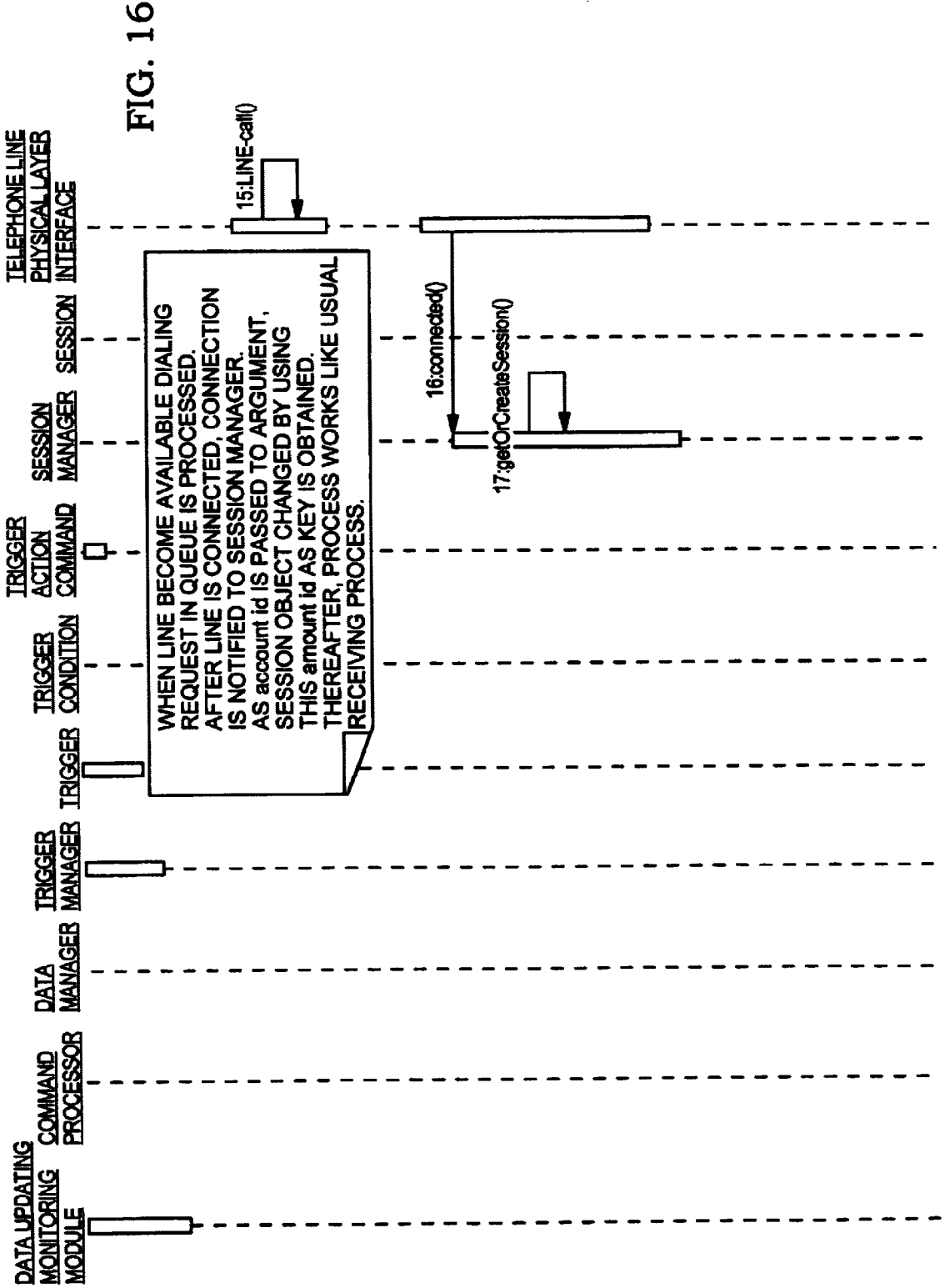
FIG. 16 is a view showing another part of tracing of messages at time of trigger determination and action execution.

Regarding an example of the order of generating messages between the objects and the users in the system shown in FIGS. 3 to 5, FIGS. 6 to 8 show tracing of messages at time of line connection; FIG. 9 shows tracing of messages at time of scenario obtaining at connection; FIG. 10 shows tracing of messages at time of line disconnection; FIGS. 11 and 12 show tracing of messages at time of command recognition, execution thereof and customization; FIGS. 13 and 14 show tracing of messages at time of trigger setting; and FIGS. 15 and 16 show tracing of messages at time of trigger determination and action execution. For the specific messages traced in FIGS. 6 to 16, see lists given in the respective drawings.

Further, FIGS. 17 and 18 show constitutional examples of tables used in the system shown in FIGS. 3 to 5.

What is claimed:

1. A telephone information service system that allows user to select and use various service items from a menu of a host system by telephone, comprising in the host system:

a trigger restarting function for notifying, when a trigger condition for a service item that the user selects is established, the user of the same, and then starting up the target service item a menu customizing function for sequentially providing selected service items to the user without any operations performed on the part of the user according to a selection of service items from a usual menu, wherein said menu customizing function and said trigger restarting function include a menu service section for controlling a menu, a trigger setting service section for setting a trigger, an information updating service section for updating service information, an inbound management section for passing a call from the user to the menu service section, and an outbound management section for dialing a specified telephone number and passing processing to the menu service section after a line is connected.

2. A telephone information service system according to claim 1, wherein said menu service section includes a function for performing addition, correction, deletion and other actions by collectively treating a guidance section (menu section) and a provided information section of a telephone menu as information, receivable commands and a group of executable commands (session data) rather than separately treating the above two sections, a function (customizing function) for dynamically changing the menu composition for the user and system configuration and storing a menu composition for each user by using a user identifier as a key, and a function for enabling the system to provide a service as a telephone menu based on the menu composition customized and stored for each user.

3. A telephone information service system according to claim 1, wherein said trigger setting service section includes a function for enabling the user to set a trigger condition and action for a value of a service item, and a function for storing the set trigger condition and the set action.

4. A telephone information service system according to claim 1, wherein said information updating service section includes a function for updating service information in accordance with updating of a data source of a provided service, a function for detecting trigger establishment by checking a set trigger condition at a time of provided information updating, a function for dynamically changing the menu composition by adding a menu item hit by a trigger to a head of a customized menu on the part of the user, and a function for passing a set telephone number of the user to the outbound management section to make a call.

5. A telephone information service system according to claim 1, wherein in order to cause said menu customizing function and said trigger restarting function to work, a telephone line physical layer interface, a session manager, a command processor and a trigger manager are included: the telephone line physical layer interface being for interchanging information with the user by telephone; the session manager for controlling a session, which is composed of a session data scenario made of a group of commands corresponding to respective service items; the command processor for actually executing the commands; and the trigger manager for performing trigger registration, condition checking and other actions.

* * * * *